(12) United States Patent
Stolte et al.

(10) Patent No.: US 11,287,104 B2
(45) Date of Patent: Mar. 29, 2022

(54) LIGHTING FIXTURE WITH DIRECT AND INDIRECT LIGHTING

(71) Applicant: KENALL MANUFACTURING COMPANY, Kenosha, WI (US)

(72) Inventors: Brandon Stolte, Lindenhurst, IL (US); Kevin Dahlen, Lindenhurst, IL (US)

(73) Assignee: KENALL MANUFACTURING COMPANY, Kenosha, WI (US)

(*) Notice: Subject to any disclaimer, the term of this patent is extended or adjusted under 35 U.S.C. 154(b) by 0 days.

(21) Appl. No.: 17/188,803

(22) Filed: Mar. 1, 2021

(65) Prior Publication Data

US 2021/0180765 A1  Jun. 17, 2021

Related U.S. Application Data

(63) Continuation-in-part of application No. 16/715,946, filed on Dec. 16, 2019, now Pat. No. 10,935,212.

(51) Int. Cl.

| F21V 3/04 | (2018.01) |
| F21S 8/02 | (2006.01) |
| F21V 7/00 | (2006.01) |
| F21S 8/06 | (2006.01) |
| F21S 8/04 | (2006.01) |
| F21Y 105/16 | (2016.01) |
| F21Y 107/30 | (2016.01) |
| F21Y 115/10 | (2016.01) |

(52) U.S. Cl.
CPC ............ *F21V 3/049* (2013.01); *F21S 8/026* (2013.01); *F21S 8/04* (2013.01); *F21S 8/063* (2013.01); *F21V 7/0016* (2013.01); *F21Y 2105/16* (2016.08); *F21Y 2107/30* (2016.08); *F21Y 2115/10* (2016.08)

(58) Field of Classification Search
CPC ...................................................... F21V 7/0016
See application file for complete search history.

(56) References Cited

U.S. PATENT DOCUMENTS

| 2013/0003360 A1* | 1/2013 | Igaki | ..................... F21V 17/164 362/184 |
| 2014/0133145 A1* | 5/2014 | Choi | ..................... F21V 29/74 362/235 |

(Continued)

*Primary Examiner* — Alexander K Garlen
(74) *Attorney, Agent, or Firm* — Marshall, Gerstein & Borun LLP; Randall G. Rueth

(57) ABSTRACT

A lighting fixture and method of providing lighting is provided herein that utilizes both direct and indirect light sources. The direct and indirect light sources can be provided in arrays of light emitting diodes (LEDs) oriented along desired axes. In some versions, the light fixtures described herein include a direct lighting array having one or more LEDs oriented to project light downwardly and an indirect lighting array having a plurality of LEDs oriented to project light in a transverse direction. Further, the light fixtures can include an indirect lighting member configured to be illuminated by the plurality of LEDs of the indirect lighting array. Additionally, or alternatively, the light fixtures described herein can include one or more controllers that are configured to independently operate the direct and indirect lighting arrays. Moreover, the indirect lighting array can be configured to emit light in a plurality of colors to visually convey information.

17 Claims, 11 Drawing Sheets

(56) References Cited

U.S. PATENT DOCUMENTS

| | | | | |
|---|---|---|---|---|
| 2014/0160736 A1* | 6/2014 | Chung | ............... | F21V 7/0016 |
| | | | | 362/184 |
| 2017/0138553 A1* | 5/2017 | Ferrari | ............... | F21V 3/00 |
| 2017/0303357 A1* | 10/2017 | Miller | ............... | H05B 45/00 |
| 2019/0383451 A1* | 12/2019 | Robinson | ............ | G02B 6/0001 |
| 2021/0108781 A1* | 4/2021 | Peng | ............... | F21S 8/04 |

* cited by examiner

LIGHTING FIXTURE WITH DIRECT AND INDIRECT LIGHTING

CROSS-REFERENCE TO RELATED APPLICATION

This application is a continuation-in-part of U.S. patent application Ser. No. 16/715,946, filed Dec. 16, 2019, which is hereby incorporated by reference herein in its entirety.

FIELD OF THE DISCLOSURE

The present disclosure generally relates to light fixtures and, more particularly, to light fixtures having multiple light sources.

BACKGROUND

Many commercial buildings, parking structures, transportation areas, or structures (e.g., tunnels), and the like are equipped with lighting systems that include one or more luminaires or light fixtures for illuminating certain areas. Most luminaires are arranged overhead and configured to emit light in a downward direction where people, objects, vehicles, etc. are situated. In addition to such direct lighting, in certain situations it may also be preferable to emit light in an indirect direction to, for example, illuminate a ceiling or other overhead structure. To provide such indirect lighting, it may be necessary to provide additional light sources, separate from the downwardly emitting light sources, aimed in a transverse direction. However, the time and costs associated with installing and operating such additional light fixtures oftentimes makes such a configuration unfeasible.

The present disclosure sets forth light fixtures embodying advantageous alternatives to existing luminaires, and that may address one or more of the challenges or needs mentioned herein, as well as provide other benefits and advantages.

SUMMARY

In accordance with a first aspect, a light fixture is disclosed that includes a housing, a direct lighting array coupled to the housing that includes one or more light emitting diodes oriented to project light along a downward axis, and an indirect lighting array coupled to the housing that includes a plurality of light emitting diodes oriented to project light along axes extending transverse to the downward axis. The light fixture further includes an indirect lighting member mounted to the housing to be within a path of illumination of the plurality of light emitting diodes of the indirect lighting array, such that energizing the plurality of light emitting diodes of the indirect lighting array illuminates the indirect lighting member.

In some forms, the indirect lighting member can be a panel having an inner edge and an outer edge, and the panel can be mounted to the housing so that the inner edge extends around the indirect lighting array, such that energizing the plurality of light emitting diodes of the indirect lighting array illuminates the outer edge of the panel.

In further forms, the indirect lighting array can be a plurality of light emitting diodes disposed in an annular configuration and the panel can have an annular configuration or the indirect lighting array can be a plurality of light emitting diodes disposed in a rectangular configuration and the panel can have a rectangular configuration. In some versions with the rectangular panel, the light fixture can include deflectors disposed adjacent to light emitting diodes disposed in corners of the rectangular configuration to thereby direct light to corners of the panel.

In further forms, the housing can include an outer housing portion having a box shape sized to fit within an opening in a dropped ceiling. Further, if desired, the housing can include a lip that is configured to rest on structure of the dropped ceiling extending around the opening, such that, with the lip resting on the structure of the dropped ceiling, the direct lighting array is recessed with respect to the dropped ceiling and the indirect lighting array is disposed below the dropped ceiling. In yet further forms, the direct lighting array can be a circular array of light emitting diodes and the housing can include an inner housing portion having outwardly angled walls having upper edges defining a circular opening extending around the direct lighting array and opposite, lower edges defining a rectangular opening.

In some forms, the light fixture can include one or more controllers that are configured to independently operate the direct lighting array and the indirect lighting array. In further forms, the indirect lighting array can be configured to selectively emit a plurality of colors.

In any of the above forms, the indirect lighting member can be a planar member or can be a shroud having a concave wall extending around the housing.

In accordance with a second aspect, a method for providing direct and indirect lighting with a light fixture is disclosed that includes energizing a direct lighting array comprising one or more light emitting diodes oriented to project light along a downward axis, energizing an indirect lighting array comprising a plurality of light emitting diodes oriented to project light along axes extending transverse to the downward axis, and illuminating an indirect lighting member mounted to the housing from light emitted from the plurality of light emitting diodes of the indirect lighting array.

In some forms, illuminating the indirect lighting member can include illuminating an outer edge of a panel mounted to the housing from light emitted from the plurality of light emitting diodes of the indirect lighting array being projected at an inner edge of the panel that extends around the indirect lighting array. In further forms, energizing the indirect lighting array can include energizing a plurality of light emitting diodes disposed in an annular configuration and illuminating the outer edge of the panel can include illuminating a circular outer edge of the panel; or energizing the indirect lighting array can include energizing a plurality of light emitting diodes disposed in a rectangular configuration and illuminating the outer edge of the panel can include illuminating a rectangular outer edge of the panel. In some versions, illuminating the rectangular outer edge of the panel can include deflecting light emitting diodes disposed in corners of the rectangular configuration to thereby direct light to corners of the panel.

In some forms, the method can include mounting a housing of the light fixture in an opening of a dropped ceiling, an outer housing portion of the housing having a box shape sized to fit within the opening with a lip configured to rest on structure of the dropped ceiling extending around the opening, such that, with the lip resting on the structure of the dropped ceiling, the direct lighting array is recessed with respect to the dropped ceiling and the indirect lighting array is disposed below the dropped ceiling.

In some forms, the method can include independently controlling operation of the direct lighting array and the indirect lighting array using one or more controllers. In further forms, independently controlling operation of the direct lighting array and the indirect lighting array can include independently dimming the direct lighting array and the indirect lighting array using the one or more controllers and/or selecting a color from a plurality of colors to be projected by the indirect lighting array.

In accordance with a third aspect, a light fixture is disclosed herein that includes a housing, a direct lighting array disposed within the housing and including one or more light emitting diodes oriented to project light along a downward axis, and an indirect lighting array coupled to the housing and including a plurality of light emitting diodes oriented to project light along axes extending transverse to the downward axis. The light fixture further includes one or more controllers that are operably coupled to the direct lighting array and the indirect lighting array to independently control the operation thereof.

In some forms, the light fixture can include one or more of the following aspects: the one or more controllers can be configured to independently control a light output level of the direct lighting array and the indirect lighting array; the one or more controllers can be configured to control operation of the direct lighting array and the indirect lighting array according to four or more preset settings; or the indirect lighting array can be configured to selectively emit a plurality of colors.

In some forms, the light fixture can include an indirect lighting member mounted to the housing to be within a path of illumination of the plurality of light emitting diodes of the indirect lighting array, such that energizing the plurality of light emitting diodes of the indirect lighting array illuminates the indirect lighting member. In further forms, the indirect lighting member can be a panel having an inner edge and an outer edge, where the panel is mounted to the housing so that the inner edge extends around the indirect lighting array, such that energizing the plurality of light emitting diodes of the indirect lighting array illuminates the outer edge of the panel. In yet further forms, the indirect lighting array can be a plurality of light emitting diodes disposed in an annular configuration and the panel can have an annular configuration; or the indirect lighting array can be a plurality of light emitting diodes disposed in a rectangular configuration and the panel can have a rectangular configuration. In forms having a rectangular configuration, the light fixture can include deflectors disposed adjacent to light emitting diodes disposed in corners of the rectangular configuration to thereby direct light to corners of the panel. In other forms, the indirect lighting member can be a shroud.

In some forms, the housing can include an outer housing portion having a box shape sized to fit within an opening in a dropped ceiling. In further forms, the housing can include a lip configured to rest on structure of the dropped ceiling extending around the opening, such that, with the lip resting on the structure of the dropped ceiling, the direct lighting array is recessed with respect to the dropped ceiling and the indirect lighting array is disposed below the dropped ceiling.

In accordance with a fourth aspect, a method for providing direct and indirect lighting with a light fixture is disclosed that includes providing a light fixture that includes a housing, a direct lighting array disposed within the housing and comprising one or more light emitting diodes oriented to project light along a downward axis, and an indirect lighting array coupled to the housing and comprising a plurality of light emitting diodes oriented to project light along axes extending transverse to the downward axis. The method further includes independently controlling a light level output of the direct lighting array and the indirect lighting array with one or more controllers of the light fixture.

In some forms, the method can include one or more of the following aspects: independently controlling the light level output of the direct lighting array and the indirect lighting array with the one or more controllers can include controlling the light level output of the direct lighting array and the indirect lighting array according to four or more preset settings; the method can include selecting one of a plurality of colors to be emitted by the indirect lighting array with the one or more controllers; or the method can include mounting a housing of the light fixture in an opening of a dropped ceiling, an outer housing portion of the housing having a box shape sized to fit within the opening with a lip configured to rest on structure of the dropped ceiling extending around the opening, such that, with the lip resting on the structure of the dropped ceiling, the direct lighting array is recessed with respect to the dropped ceiling and the indirect lighting array is disposed below the dropped ceiling.

In some forms, the method can include illuminating an indirect lighting member mounted to the housing from light emitted from the plurality of light emitting diodes of the indirect lighting array. In further forms, illuminating the indirect lighting member can include illuminating an outer edge of a panel mounted to the housing from light emitted from the plurality of light emitting diodes of the indirect lighting array being projected at an inner edge of the panel that extends around the indirect lighting array. Moreover, if desired, illuminating the outer edge of the panel can include deflecting light emitted from the light emitting diodes of the indirect lighting array to thereby direct light to portions of the outer edge of the panel. In other forms, illuminating the indirect lighting member can include illuminating a concave wall of a shroud mounted to the housing with light emitted from the plurality of light emitting diodes.

In accordance with a fifth aspect, a light fixture is disclosed that includes a housing, a direct lighting array coupled to the housing and comprising one or more light emitting diodes oriented to project light along a downward axis, an indirect lighting array coupled to the housing and comprising a plurality of light emitting diodes oriented to project light along axes extending transverse to the downward axis, and an indirect lighting member mounted to the housing to be laterally outwardly from and within a path of illumination of the plurality of light emitting diodes of the indirect lighting array, such that energizing the plurality of light emitting diodes of the indirect lighting array illuminates the indirect lighting member. Further, the indirect lighting member can include a shroud mounted to the housing above the indirect lighting array, where the shroud has an outer wall extending outwardly from the housing to intersect the path of illumination of the plurality of light emitting diodes of the indirect lighting array.

In some forms, the light fixture can include one or more of the following aspects: the outer wall of the shroud can have a convex configuration, a concave configuration, or an angled portion having a linear cross-section in a vertical plane, a distal end of the outer wall of the shroud can include an upper surface and a lower surface angled relative to one another giving the distal end an outwardly pointed configuration, the outer wall of the shroud can have a textured configuration such that the shroud is configured to diffuse light, the shroud can include a coupling wall extending upwardly from the outer wall and the housing can include a channel sized to receive the lock wall therein to interlock the shroud with the housing, the housing can include a top wall configured to be mounted to a substrate of a building, or the light fixture can include a mounting rod where the housing is coupled to the mounting rod to thereby secure the light fixture to a substrate of a building.

In some forms, the indirect lighting member can further include a bottom wall mounted to the housing to be laterally outwardly from and within the path of illumination of the plurality of light emitting diodes of the indirect lighting array, where the outer wall of the shroud extends over at least a portion of the bottom wall. In these forms, a distal end of the outer wall of the shroud can be disposed outwardly of an outer edge of the bottom wall, the bottom wall can be transparent or translucent, such that light emitted from the indirectly lighting array or transient light can pass therethrough to illuminate the diffuser, the shroud can include an interior wall, where the outer wall extends outwardly from a top portion of the interior wall, a bottom edge of the interior wall can abut a top surface of the bottom wall, the shroud and the bottom wall can have annular configurations, the indirect lighting array can be oriented to project light along axes extending perpendicular to the downward axis, and/or the bottom wall can have a planar configuration aligned with the axes of the indirect lighting array. In a further form, at least a portion of an outer wall of the housing and at least a portion of the outer wall of the shroud have frusto-conical configurations that are aligned with one another.

DETAILED DESCRIPTION

Figure 1:
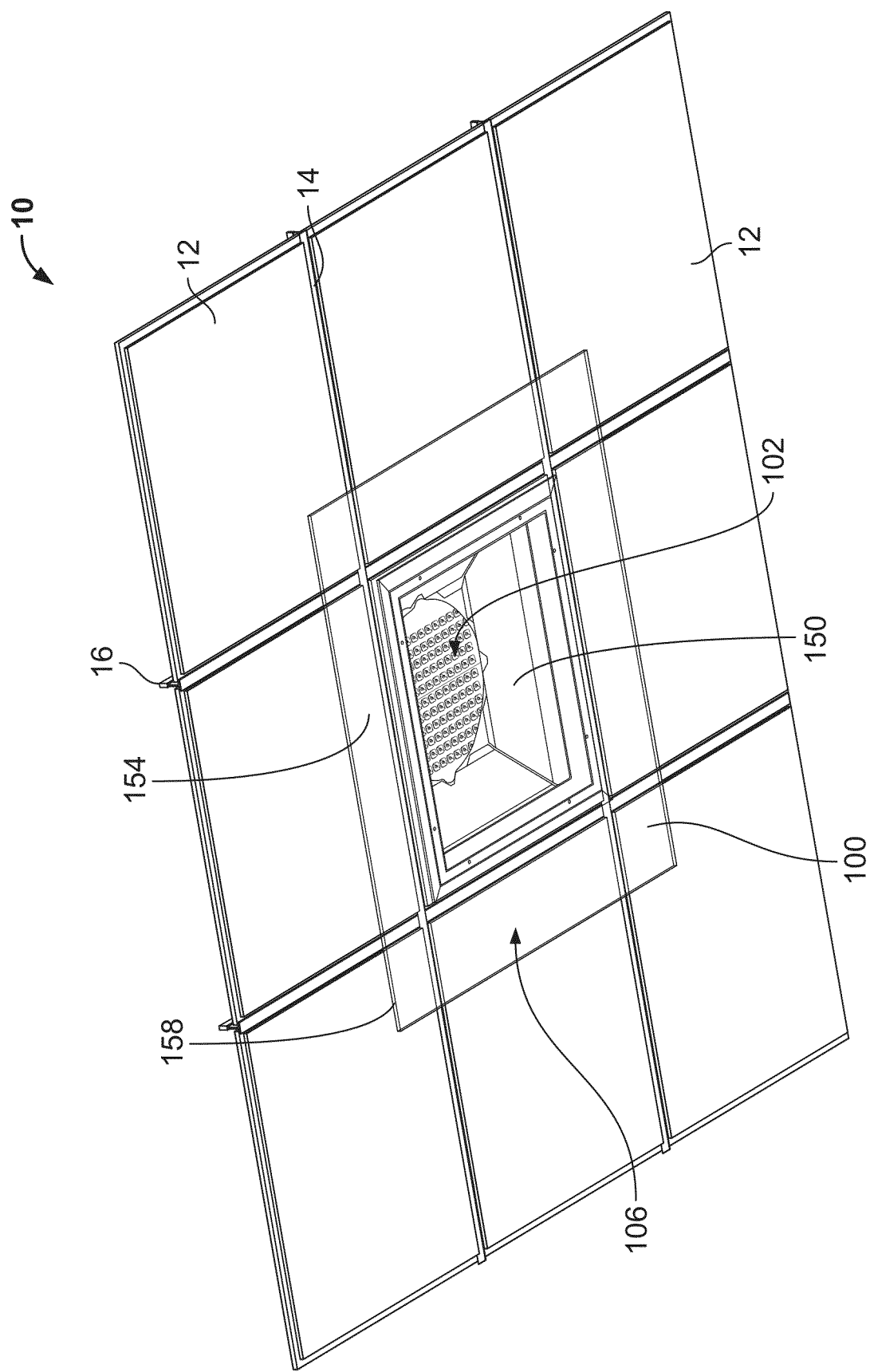
FIG. 1 is a bottom perspective view of a first example light fixture having a square indirect lighting member mounted in a dropped ceiling in accordance with various embodiments.
Figure 2:
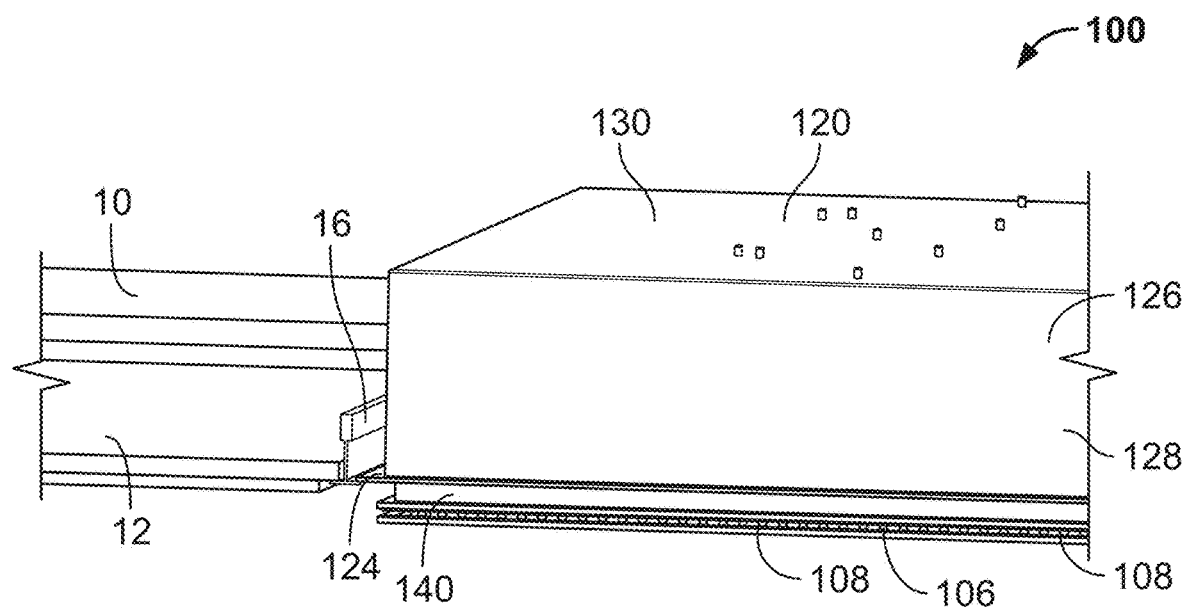
FIG. 2 is a first cross-sectional view of the light fixture of FIG. 1 showing a housing mounted to the dropped ceiling.

A lighting fixture and method of providing lighting is provided herein that utilizes both direct and indirect light sources. The direct and indirect light sources can be provided in arrays of light emitting diodes (LEDs) oriented along desired axes. In some versions, the light fixtures described herein include a direct lighting array that includes a plurality of LEDs oriented to project light downwardly and an indirect lighting array that includes a plurality of LEDs oriented to project light in a transverse direction. Further, the light fixtures can include an indirect lighting member configured to be illuminated by the plurality of LEDs of the indirect lighting array. Additionally, or alternatively, the light fixtures described herein can include one or more controllers that are configured to independently operate the direct and indirect lighting arrays. Moreover, the indirect lighting array can be configured to emit light in a plurality of colors to visually convey information.

Details of example lighting fixtures 100 are shown in FIGS. 1-7. The light fixtures 100 include direct lighting 102 having one or more light sources 104 oriented to emit light downward along a downward axis D and indirect lighting 106 having one or more light sources 108 oriented to emit light along axes that extend transverse to the downward axis D. For example, the light sources 108 of the indirect lighting 106 can be oriented to emit light in a horizontal plane. In other examples, the light sources 108 of the indirect lighting array 106 can be oriented to emit light at an upward angle relative to horizontal, e.g., between 0 and 10 degrees or between 0 and 30 degrees, and/or at a downward angle relative to horizontal, e.g., between 0 and 5 degrees or between 0 and 10 degrees.

Figure 5:
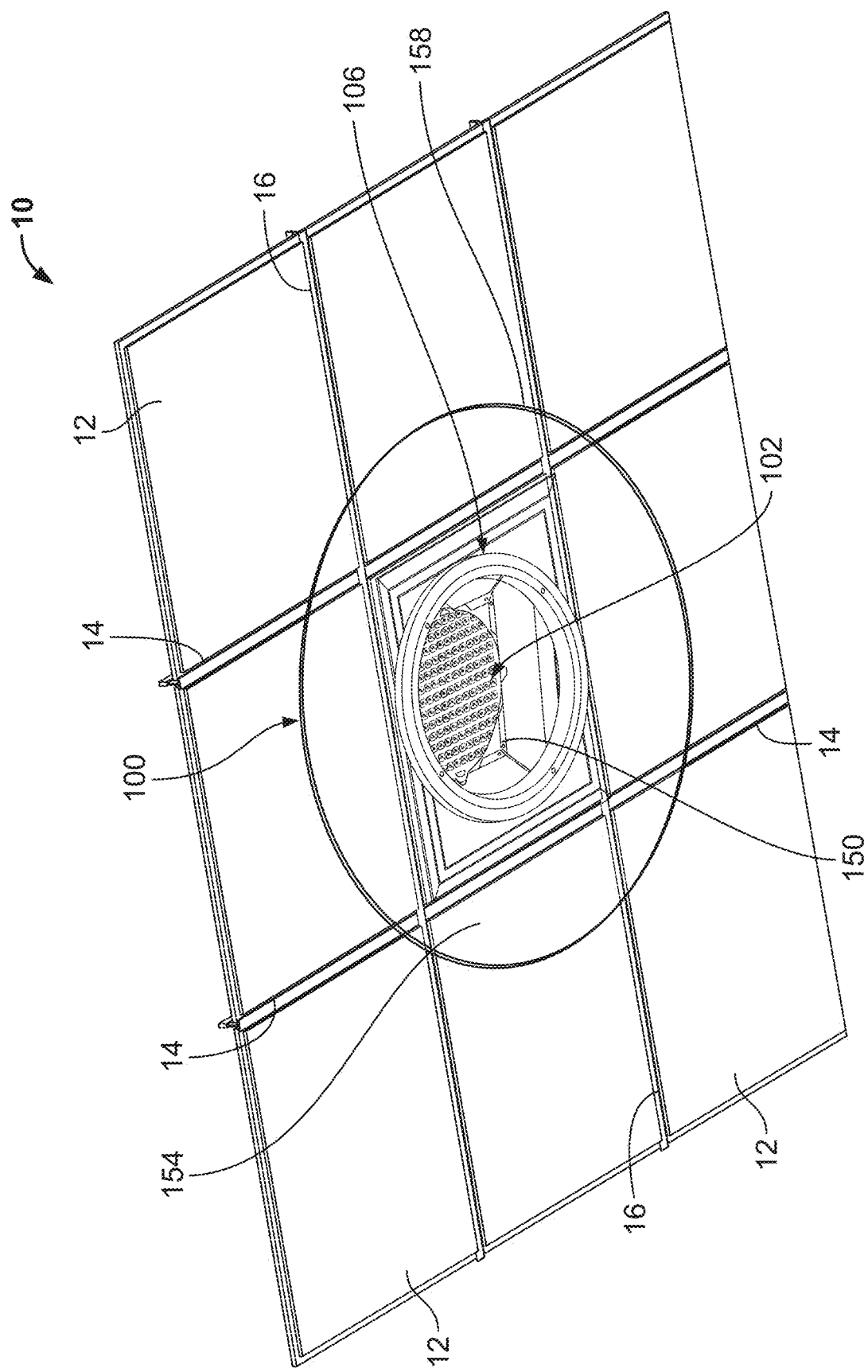
FIG. 5 is a bottom perspective view of a second example light fixture having an annular indirect lighting member mounted in a dropped ceiling in accordance with various embodiments.
Figure 6:
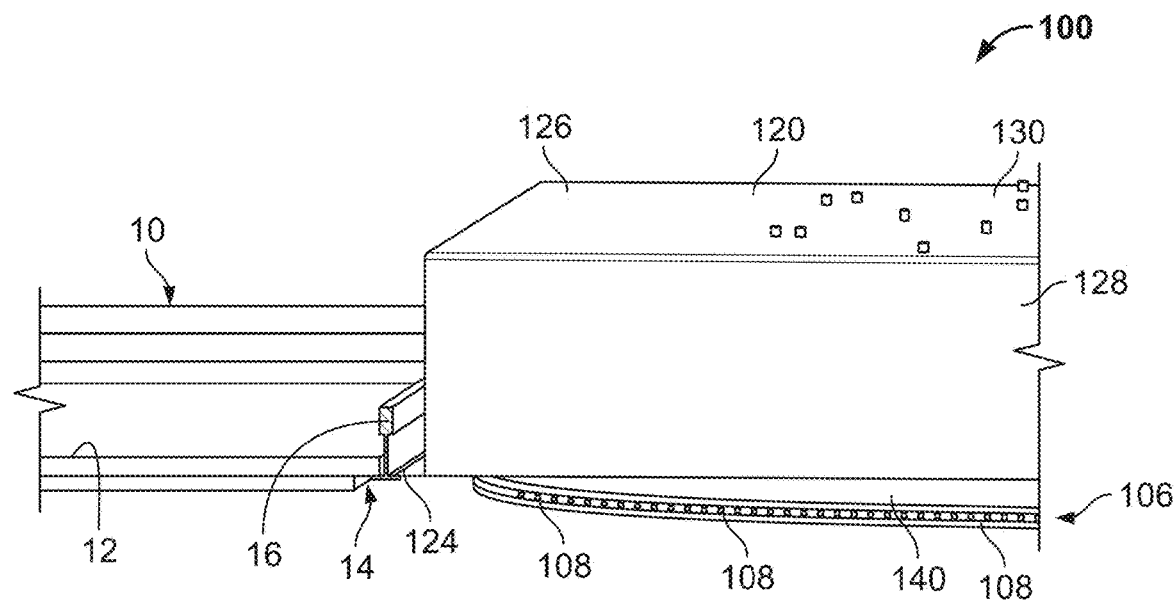
FIG. 6 is a first cross-sectional view of the light fixture of FIG. 5 showing a housing mounted to the dropped ceiling.

Example direct lighting 102 is shown in FIGS. 1 and 5. In some versions, the direct lighting 102 can be a direct lighting array including a plurality of LEDs 104 disposed in spaced relation to one another. The LEDs 104 of the direct lighting array 102 can be disposed in any desired shape or configuration. For example, as shown, the direct lighting array 102 can have a generally circular pattern. Other suitable shapes include a rectangular array, an annular array, or other, polygonal or curvilinear shapes. Moreover, the LEDs 112 of the direct lighting array 110 can have a varying angle relative to vertical and still be considered to provide direct, downward lighting, e.g., between 0 and 30 degrees from vertical, between 0 and 15 degree from vertical, or between 0 and 5 degrees from vertical.

As shown, the LEDs 104 are mounted to a circuit board 110, which can have a shape complementary to the array 102 as shown. Further, the direct lighting 102 can have a lens 112 extending in front of the LEDs 104 and across the downward axis D to thereby alter light emitted by the LEDs 104 in a desired manner, e.g., concentrating, dispersing, etc. The lens 112 can be mounted to the circuit board 110 and can be a single piece member incorporating portions for each of the LEDs 104 as shown, or can be individual lenses for each of the LEDs 104. In the illustrated form, the lens 112 includes domed portions 112a extending over each of the LEDs 104.

Example indirect lighting 106 is shown in FIGS. 2 to 4 and 6 to 7. In some versions, the indirect lighting 106 can be an indirect lighting array including a plurality of LEDs 108 oriented outwardly from the fixture 100 to emit light along axes that extend transverse to the downward axis D. As shown, the indirect lighting array 106 can be mounted to a circuit board 114, which is coupled to a frame 116 that positions the LEDs 108 along a perimeter that extends around the direct lighting 102 to emit light outwardly with respect thereto. If desired, the frame 116 can be configured as a heat sink to dissipate heat generated by the LEDs 108. Moreover, the indirect lighting array 106 can be vertically offset from the direct lighting array 102, such that the direct lighting array 102 is recessed with respect to the indirect lighting array 106. In a first form, shown in FIG. 3, the frame 116 has a square/rectangular shape with the LEDs 108 spaced along an outer surface 118 thereof. In a second form, shown in FIG. 7, the frame 116 has a circular shape with the LEDs 108 spaced along an outer surface 118 thereof.

The light fixture 100 further includes a housing 120 having an interior 122 sized to receive components therein. In some versions, as shown in FIGS. 1, 2, 5, and 6 the housing 120 can be configured to be mounted to and within a dropped ceiling 10. The dropped ceiling 10 includes square tiles 12 mounted within openings 14 defined by frames 16. Advantageously, the housing 120 can have an outer cross-section sized to fit within one of the openings 14 defined by the frames 16 of the dropped ceiling 10. Further, the housing 120 can include an outwardly extending lip 124 around all or a portion of the circumference thereof. As shown, the lip 124 is sized and configured to rest on and/or be secured to the frames 16 when the light fixture 100 is mounted to the dropped ceiling 10. If desired, the lip 124 can be disposed at a vertical location along the housing 120, such that when the lip 124 engages the frames 16, a majority of the housing 120 and the interior 122 thereof is disposed above the dropped ceiling 10. In an additional or alternative form, with the lip 124 resting on the frame 16 of the dropped ceiling 10, the direct lighting array 102 can be recessed, i.e., above the tiles 12 and frames 16, with respect to the dropped ceiling 10 and the indirect lighting array 106 can be disposed below the tiles 12 and frames 16 of the dropped ceiling 10.

Figure 3:
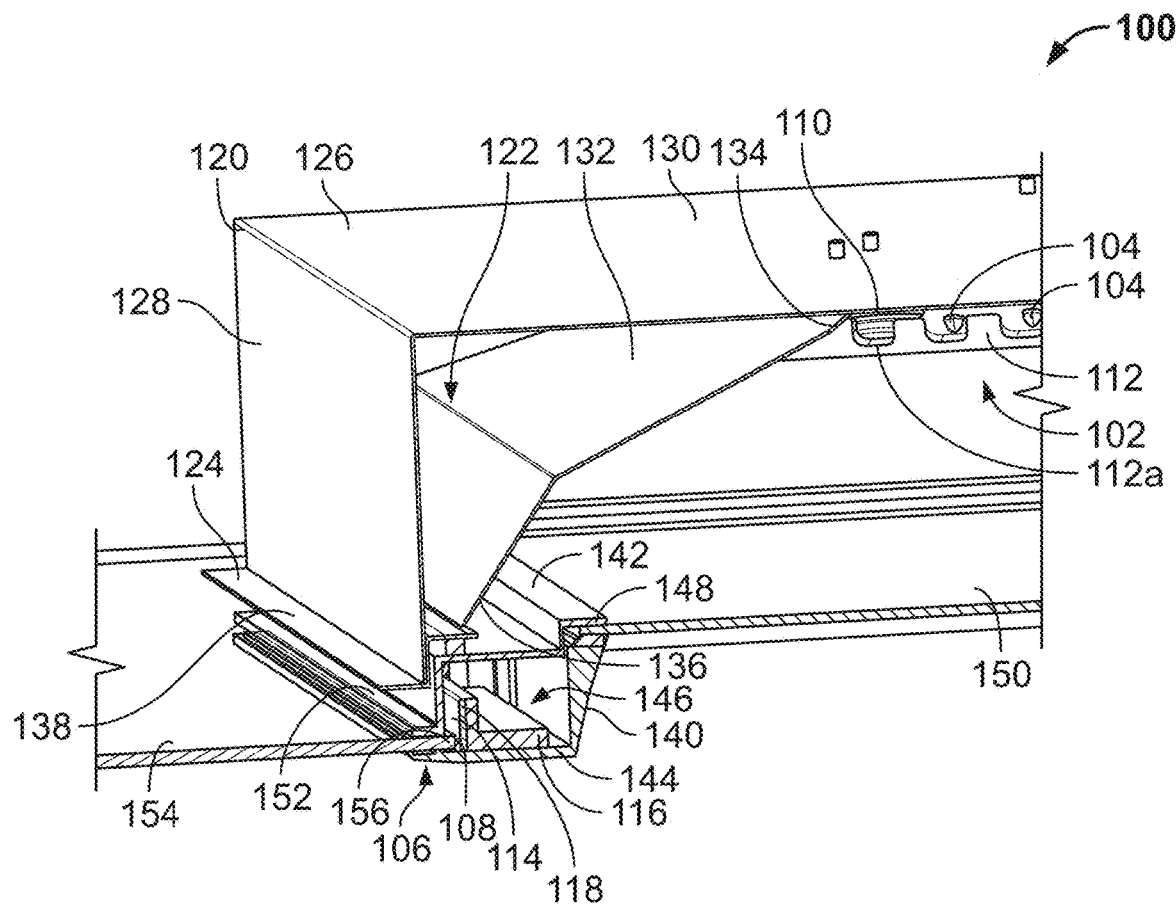
FIG. 3 is a second cross-sectional view of the light fixture of FIG. 1 showing the housing a direct lighting array, an indirect lighting array, and the indirect lighting member.
Figure 4:
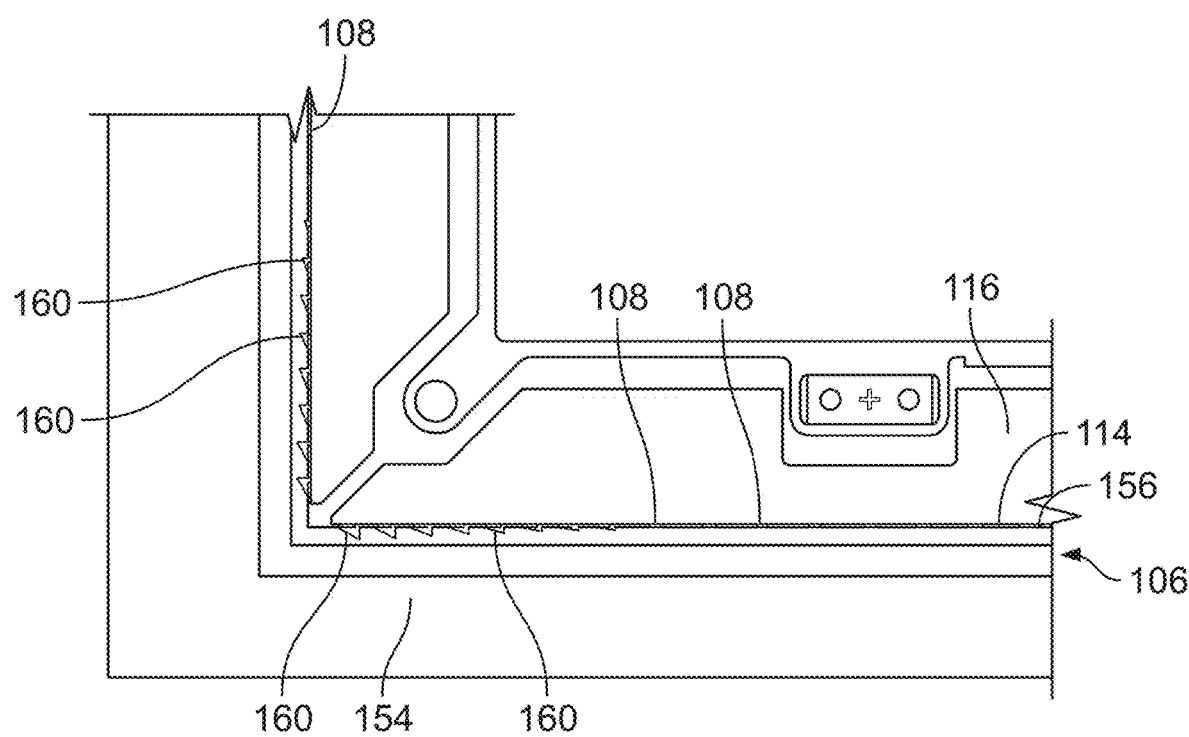
FIG. 4 is a third cross-sectional view of the light fixture of FIG. 1 showing deflectors of the indirect lighting member disposed adjacent to light sources of the indirect lighting array.
Figure 7:
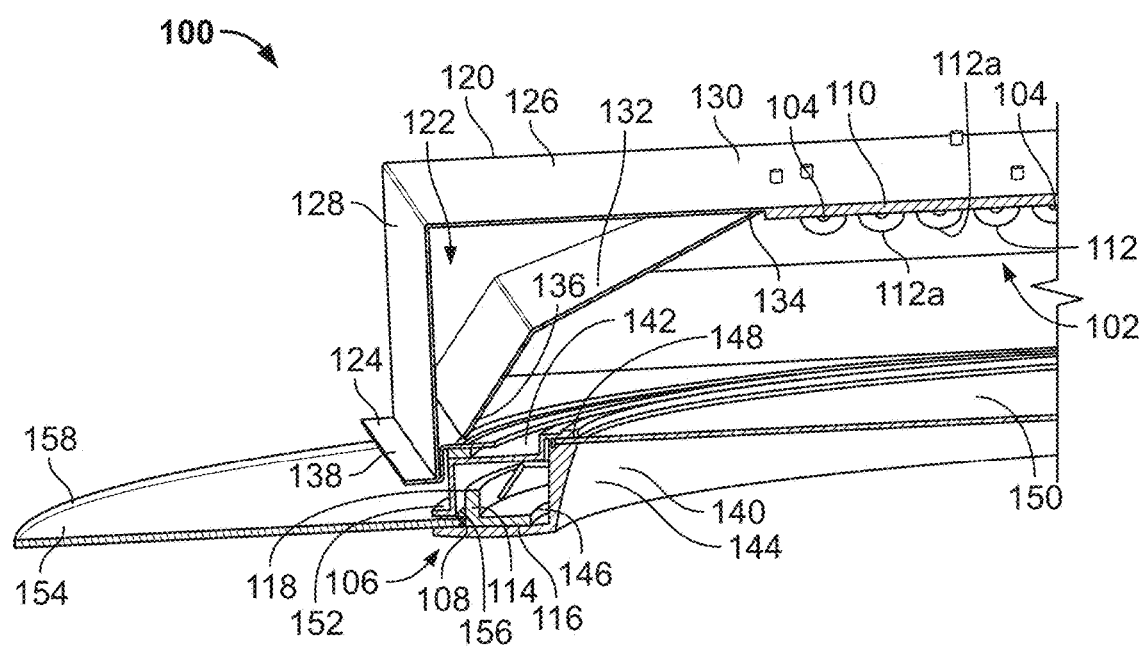
FIG. 7 is a second cross-sectional view of the light fixture of FIG. 5 showing the housing a direct lighting array, an indirect lighting array, and the indirect lighting member.

In some versions, the housing 120 can have a multi-part configuration to hold and orient the direct and indirect lighting 102, 106. Pursuant to this, as shown in FIGS. 3 and 7, the housing 120 can include an outer housing portion 126 having a box-shaped configuration with sidewalls 128 and a top wall 130, an inner housing portion or canopy 132 having a top edge 134 that extends around the direct lighting array 102 and an opposite, bottom edge 136, a flange member 138 providing the lip 124, and an indirect lighting housing portion 140. In the illustrated form, the inner canopy 132 includes outwardly angled walls 141 and the top edges 134 are shaped to be complementary to a perimeter of the direct lighting array 102. For example, the top edges 134 can define a circular opening. Moreover, the bottom edges 136 of the walls 141 can extend to define a square/rectangular opening adjacent to the outer housing portion 126.

As shown, the inner canopy 132 engages the flange member 138, which is captured between the outer housing portion 126 and the indirect lighting housing portion 140. The indirect lighting housing portion 140 includes upper and lower members 142, 144 that define an interior 146 sized to receive the indirect lighting array 106, including the LEDs 108, the circuit board 114, and frame 116. Advantageously, interior edges 148 of the upper and lower members 142, 144 can be used to capture a transparent cover 150 therebetween. The transparent cover 150 closes off the bottom of the housing 120 while allowing light emitted from the direct lighting 102 to pass therethrough.

In the forms shown in FIGS. 3 and 7, exterior edges 152 of the upper and lower members 142, 144 can be used to capture an indirect lighting member 154 therebetween. In this form, the member 152 is a panel having an open shape, such as square/rectangular or annular as shown, with an interior edge 156 and an exterior edge 158. The exterior edges 152 of the upper and lower members 142, 144 position the interior edge 156 of the panel 154 adjacent to the LEDs 108 of the indirect lighting array 106, such that energizing the LEDs 108 causes light to be emitted into the panel 154, which illuminates the exterior edge 158 thereof. For example, as shown, the interior edge 156 of the panel 154, whether square/rectangular or circular, extends around the indirect lighting array 106. Although the panel 154 is shown as a planar member, the panel 154 can have a curved or angled shape, which can include a coating, layer, or other configuration designed to transfer light within the panel 154.

In some versions, the panel 154 may have portions of the exterior edge 158 where the LEDs 108 are not directly oriented. In order to illuminate these portions, the interior edge 156 of the panel 154 can include deflectors 160 in the form of recesses therein. The deflector recesses 160 can then be configured to deflect light emitted by the LEDs 108 adjacent thereto so that the entire exterior edge 158 is illuminated. For example, with the square panel as shown, the deflector recesses 160 can be disposed around the corners of the interior edge 156, with increasing degrees of deflection closer to the corner. Of course, deflectors can be incorporated into the individual LEDs 108 or be separate members disposed forwardly of the LEDs 108.

Figure 8:
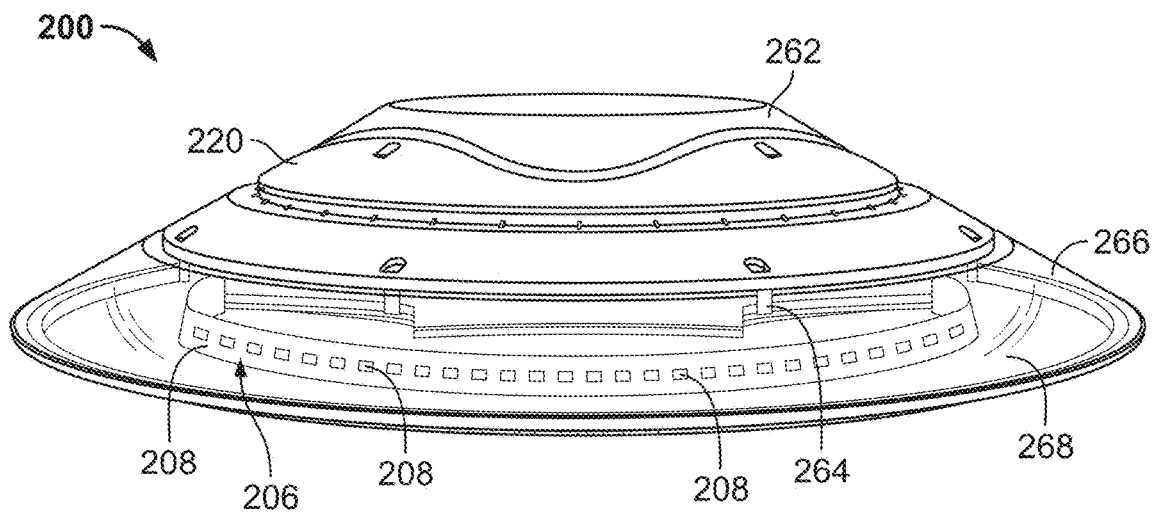
FIG. 8 is a top perspective view of a third example light fixture in accordance with various embodiments.
Figure 9:
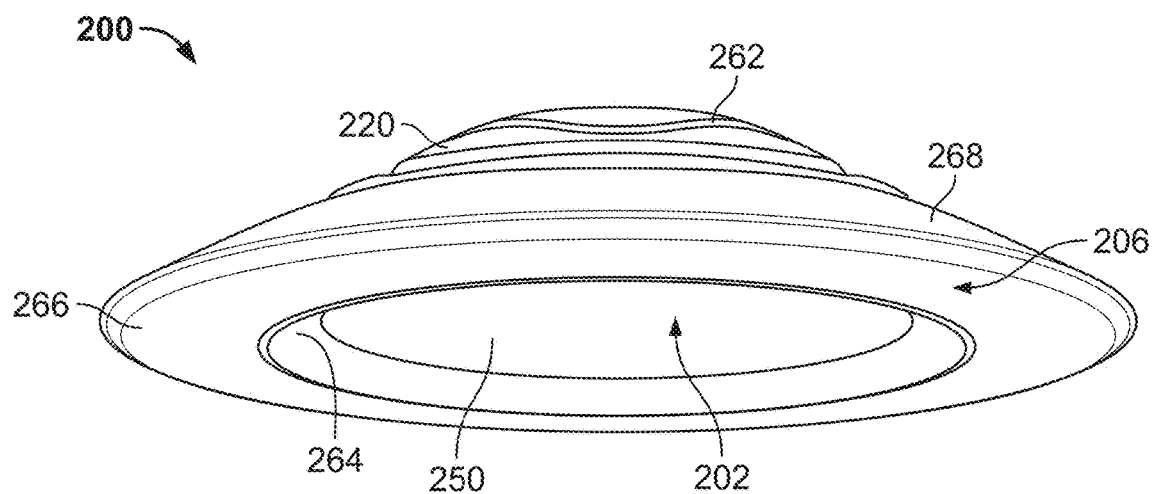
FIG. 9 is a bottom perspective view of the light fixture of FIG. 8.

Another example light fixture 200 is shown in FIGS. 8 and 9. The light fixture 200 of this form is configured to be hung from a ceiling rather than mounted to a dropped ceiling 10 as with the above forms. Many of the components of the light fixture 200 are similar to those discussed above and, as such, similar reference numbers will be used to indicate similar structures for the sake of brevity. For example, the light fixture 200 of this form includes direct and indirect lighting 202, 206 received within a housing 220, where the lighting arrays 202, 206 can be configured similarly to the above described arrays 102, 106.

Rather than a housing 120 as described above that is configured to mount to a dropped ceiling 10, the housing 220 of this form includes an upper housing portion 262 and a lower housing portion 264 that are releasably coupled together. The upper housing portion 262 is sized to receive the direct lighting array 202 and the lower housing portion 264 sized to receive the indirect lighting array 206, such that the direct lighting array 202 is recessed with respect to the direct lighting array 206. The light fixture 200 of this form can further include an indirect lighting member 266 that extends around the fixture 200 to be illuminated by the indirect lighting array 206. In the illustrated form, the indirect lighting member 266 is a shroud having an annular configuration with a concave outer surface 268 that opens to the lower housing portion 264. If desired, the shroud 266 can be coupled to the lower housing portion 264 or form a part thereof. Further, the shroud 266 can be made from a darkened or translucent material or have an etched, frosted, or sandblasted layer, coating, or surface in order to provide softened lighting from the indirect lighting array 206. Additionally, the light fixture 200 can include a transparent or translucent cover 250 coupled to the housing 220 across an open bottom thereof.

It will be understood that the light fixtures 100, 200 described herein include components to operate and control operation of the direct and indirect lighting arrays 102, 202, 106, 206. Pursuant to this, as shown in FIG. 10, the light fixture 100, 200 can include one or more controllers 170, 270 and drivers 172, 272 configured to condition a power supply to be suitable for the lighting arrays 102, 202, 106, 206.

Figure 10:
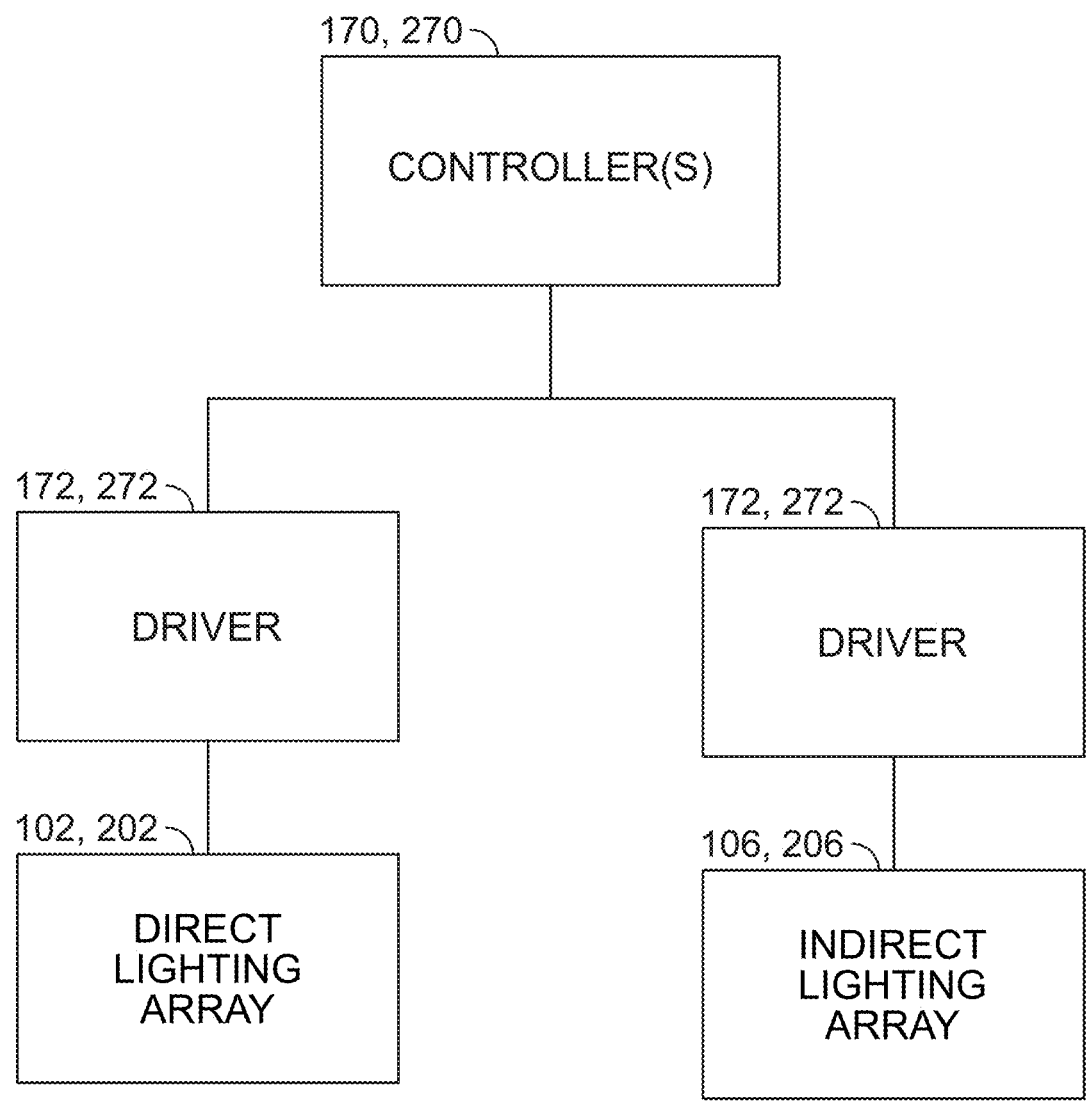
FIG. 10 is a diagrammatic view of a control system for a light fixture in accordance with various embodiments.
Figure 11:
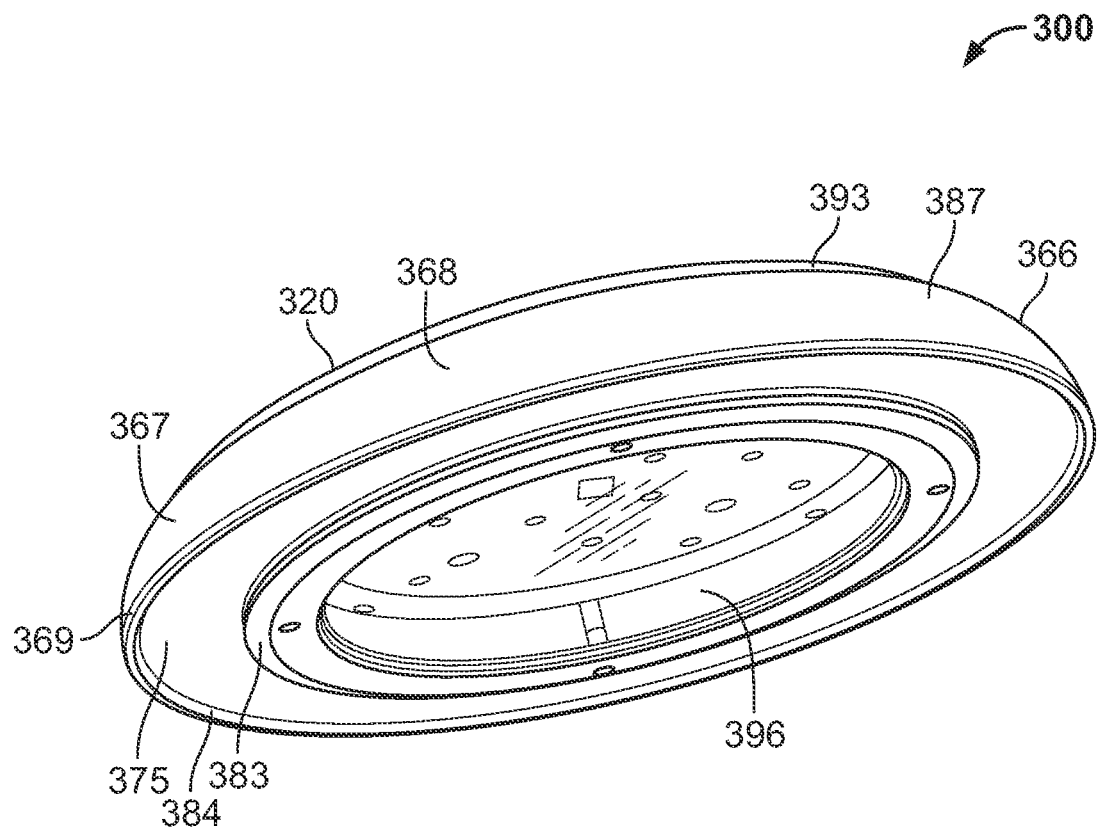
FIG. 11 is a bottom perspective view of a fourth example light fixture in accordance with various embodiments.
Figure 12:
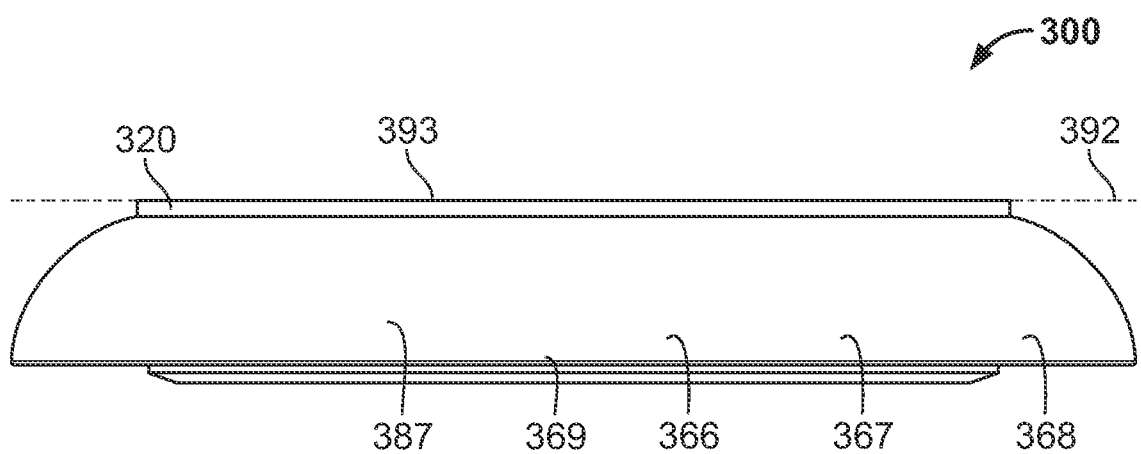
FIG. 12 is a side elevational view of the light fixture of FIG. 11.

Advantageously, as shown in FIG. 10, the controller 172, 272 can be configured to control operation of the direct and indirect lighting arrays 102, 202, 106, 206 independently. Further, the direct and indirectly lighting arrays 102, 106 can be selectively and independently dimmable. As such, the controller 172, 272 can be operated to selectively energize the lighting arrays 102, 202, 106, 206 as well as to select a light level for the arrays 102, 202, 106, 206.

To operate the light fixture 100, 200, two dimmer switches can be electrically coupled thereto to independently set a light level for the lighting arrays 102, 202, 106, 206. Alternatively, if desired, the light fixture 100, 200 can include a predetermined number of settings for the lighting arrays 102, 106. For example, the predetermined settings can include a full light setting with both the lighting arrays 102, 202, 106, 206 at full power, a normal setting with a reduced power for the direct lighting array 102, 202 and full power for the indirect lighting array 106, 206, a low setting with reduced power for both the lighting arrays 102, 202, 106, 206, and an off setting. For other situations, the lighting arrays 102, 202, 106, 206 do not need to have a dimming functionality, such that the light fixtures 100, 200 can be switched between on and off states.

In some forms, the LEDs 108, 208 of the indirect lighting array 106, 206 can be configured to emit multiple colors and/or individual ones of the LEDs 108, 208 can have differing colors. With this configuration, selection of a particular color from a plurality of colors can be used to visually convey information. For example, in a parking garage setting, the light fixture 100, 200 can be aligned with a particular parking spot. Thereafter, the indirect lighting array 106, 206 can be illuminated in a green color to indicate an open parking spot and illuminated in a red color to indicate a taken parking spot.

Other example light fixtures 300, 400 are shown in FIGS. 11-18. The light fixtures 300, 400 of these forms are configured to be hung from or mounted to a ceiling or other substrate, e.g., wall, floor, etc., of a building rather than recessed/mounted to a ceiling 10 as with the above forms. As with the above forms, the light fixtures 300, 400 include direct and indirect lighting arrays 302, 402, 306, 406 coupled to and received within a housing 320, 420, where the lighting arrays 302, 402, 306, 406 can be configured similarly to the above described arrays 102, 106 to include one or more LEDs with the associated electronics and control. As shown, the LEDs of the direct lighting arrays 302, 402 are oriented to project light along a downward axis and the LEDs of the indirect lighting arrays 306, 406, are oriented to project light outwardly from the housing 320, 420 along axes extending transverse to the downward axis. In one example, the downward axis can be generally, e.g., within 0-10 degrees, vertical and the axes of the indirect lighting arrays 306, 406 can be generally perpendicular to the vertical axis.

The light fixture 300, 400 of these forms can further include an indirect lighting member 366, 466 that extends around the fixture 300, 400 to be illuminated by the indirect lighting array 306, 406. As shown, the indirect lighting member 366, 466 can be mounted to the housing 320, 420 so that at least a portion thereof is laterally outwardly from and within a path of illumination of the LEDs of the indirect lighting array 306, 406. With this configuration, energizing the LEDs of the indirect lighting array 306, 406 at least partially illuminates the indirect lighting member 366, 466.

Figure 13:
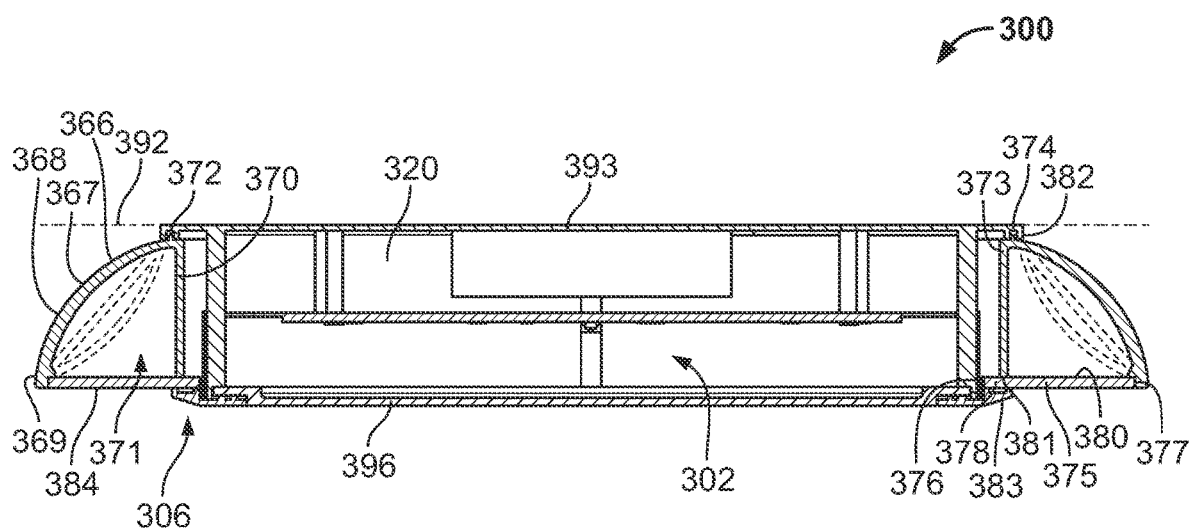
FIG. 13 is a cross-sectional view of the light fixture of FIG. 11.
Figure 14:
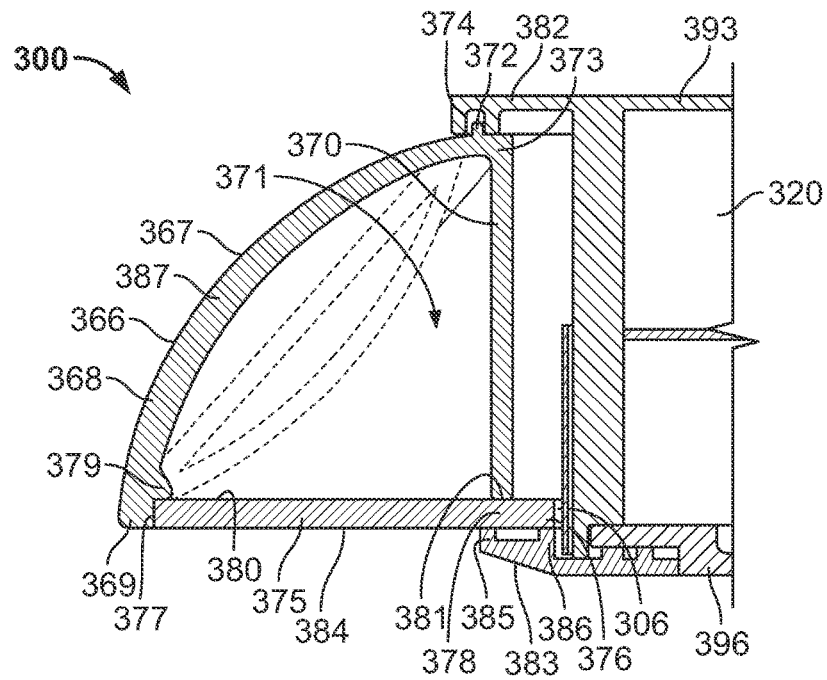
FIG. 14 is a cross-sectional detail view of the light fixture of FIG. 11.
Figure 15:
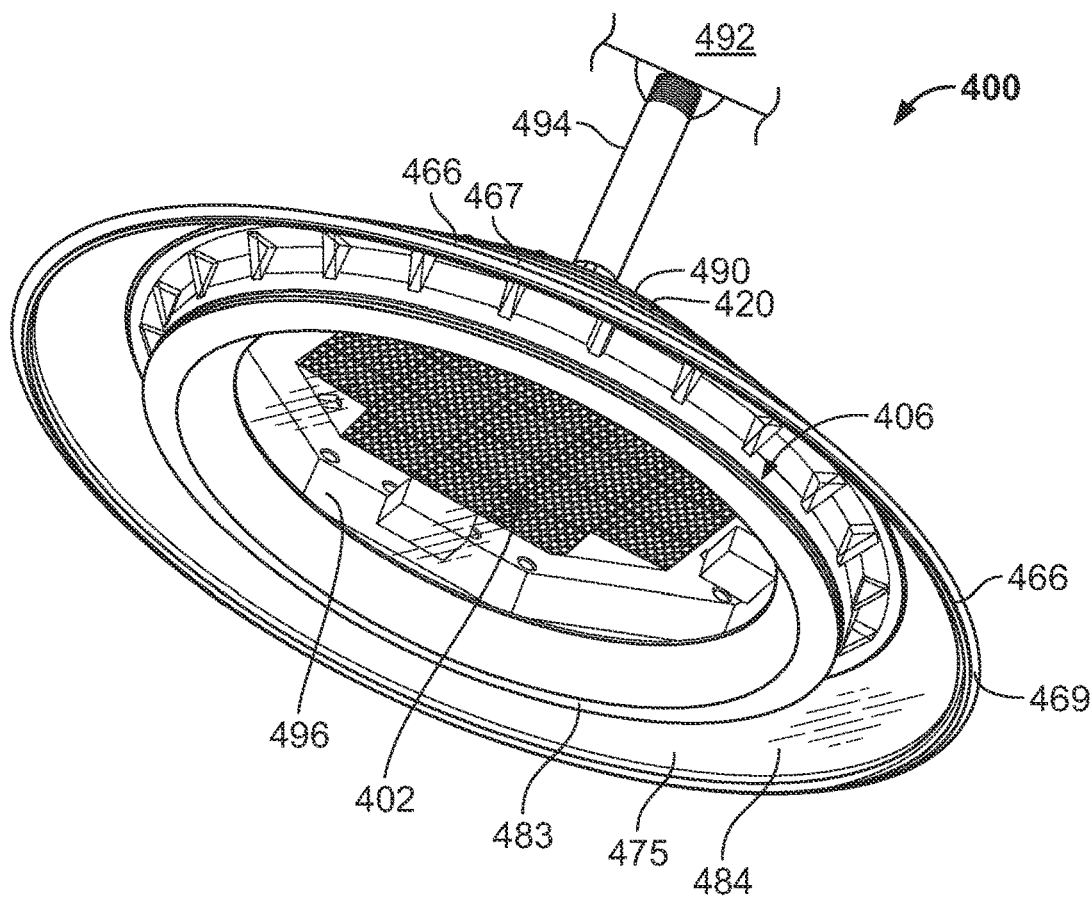
FIG. 15 is a bottom perspective view of a fourth example light fixture in accordance with various embodiments.
Figure 16:
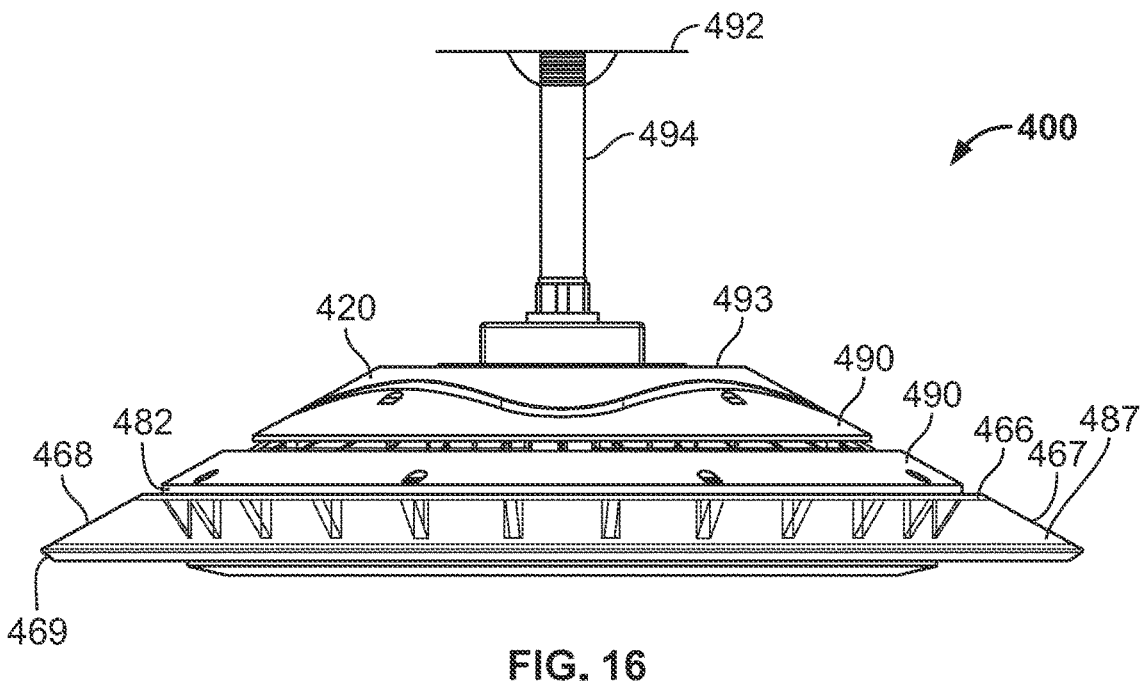
FIG. 16 is a side elevational view of the light fixture of FIG. 15.
Figure 17:
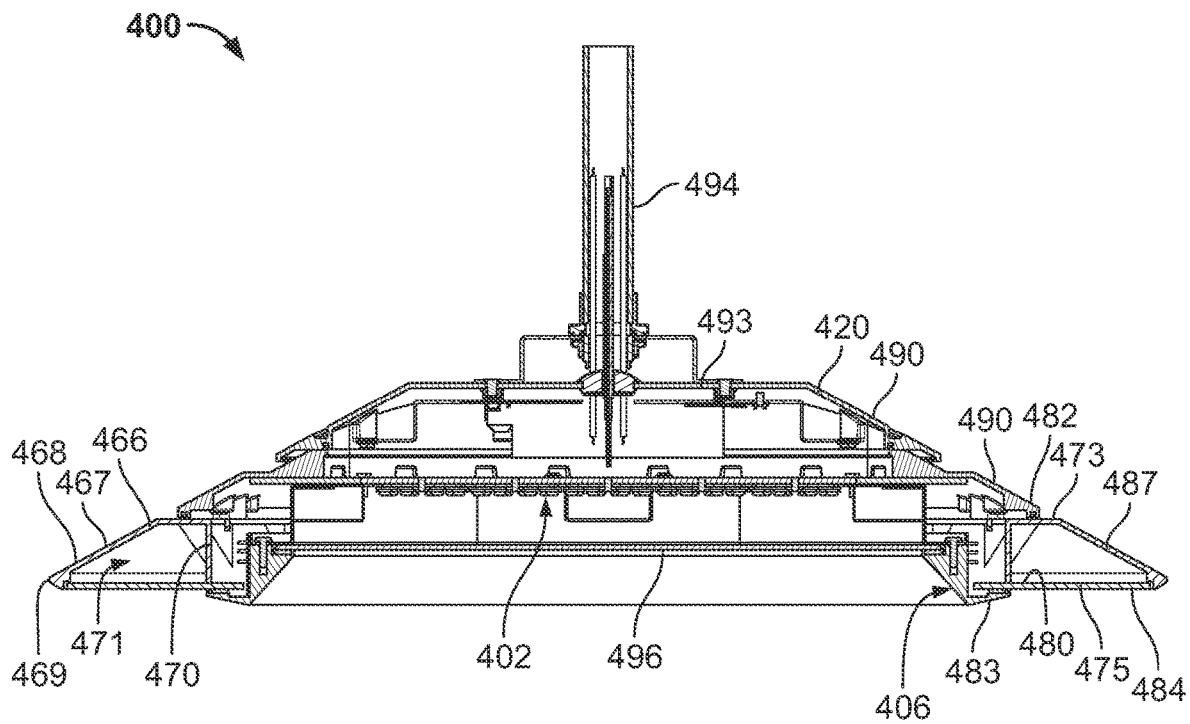
FIG. 17 is a cross-sectional view of the light fixture of FIG. 15.

The indirect lighting member 366, 466 includes a shroud 367, 467 mounted to the housing 320, 420 to be disposed above the indirect lighting array 306, 406 relative to the downward axis. As shown, the shroud 367, 467 can also be laterally offset from the indirect lighting array 306, 406, e.g., radially outward therefrom. The shroud 367, 467 includes an outer wall 368, 468 that extends outwardly away from the housing 320, 420 and extends downwardly such that a distal end 369, 469 of the outer wall 368, 468 intersects the path of illumination of the LEDs of the indirect lighting array 306, 406. The outer wall 368, 468 can have a variety of suitable configurations, with portions thereof being convex, concave, or linear in a vertical cross-section, e.g., angled or frusto-conical for various shapes, as shown in FIGS. 13, 14, 17, and 18. Specifically, FIGS. 13 and 14, for example, illustrates the disclosed version in solid lines as having a convex shape. Alternatively, FIGS. 13 and 14 depict one alternative in broken lines having a linear configuration, and a second alternative in broken lines having a concave configuration. Other possibilities exist.

As shown, the shroud 367, 467 can further include an upstanding inner wall 370, 470 with the outer wall 368, 468 extending from a top of the inner wall 370, 470. So configured, the inner wall 370, 470 and the outer wall 368, 468 define a downwardly opening cavity 371, 471 extending around the housing 320, 420. In the illustrated form, the inner wall 370, 470 is an upstanding wall with a vertical configuration. With a circular housing 320, 420 as shown in the figures, the shroud 367, 467, including the inner and outer walls 370, 470, 368, 468 thereof, has an annular configuration. In other forms, the housing 320, 420 and shroud 367, 467 can have a rectangular configuration or other polygonal shape, such that the inner and outer walls 370, 470, 368, 468 can have a corresponding number of sides having planar configurations.

The shroud 367, 467 or portions thereof, such as one of the inner and outer walls 370, 470, 368, 468 thereof, can be configured as a diffuser with a textured configuration, e.g., an etched, frosted, or sandblasted layer, coating, or surface, in order to diffuse lighting from the indirect lighting array 306, 406 and/or transient light. In other forms, the shroud 367, 467 or portions thereof can be made from a darkened or translucent material.

The shroud 367, 467 can be coupled or mounted to the housing 320, 420 by any suitable configuration or mechanism. In one form, the shroud 367, 467 can include a coupling wall 372, 472 extending upwardly from a top portion 373, 473 of the outer wall 368, 468 and the housing 320, 420 can include a corresponding channel or notch 374, 474 to receive the coupling wall 372, 472 therein. In the illustrated form, the top portion 373, 473 can have a flat, horizontal configuration for the housing 320, 420 to rest thereon and engage as discussed below.

In these forms, the indirect lighting member 366, 466 can further include a bottom panel 375, 475 mounted to the housing 320, 420 and configured similarly to the panel 152 discussed above with respect to prior embodiments disclosed herein. The panel 375, 475 can have an open shape, such as square/rectangular or annular (e.g., donut) as shown, with an interior edge 376, 476 and an exterior edge 377, 477. An interior portion 378, 478 of the panel 375, 475 is mounted to the housing 320, 420 to dispose the interior edge 376, 476 adjacent to, and laterally outward from, the LEDs of the indirect lighting array 306, 406, such that energizing the LEDs causes light to be emitted into the panel 375, 475. So configured, at least some of the light emitted from the indirect lighting array 306, 406 can pass through the panel 375, 475 and into the shroud 367, 467 to at least partially illuminate the shroud 367, 467. In some forms, the panel 375, 475 can be transparent or translucent so that light emitted from the indirect lighting array 306, 406 and transient light can pass therethrough to illuminate the shroud 367, 467. In the illustrated form, the panel 375, 475 has a planar configuration.

As shown, the outer wall 368, 468 of the shroud 367, 467 extends over at least a portion of the panel 376, 476, such that light passing therethrough can illuminate the outer wall 368, 468. In the Illustrated form, the outer wall 368, 468 extends downwardly such that the distal end 369, 469 thereof is disposed adjacent to the exterior edge 377, 477 of the panel 375, 475 to intersect the path of illumination of the LEDs of the indirect lighting array 306, 406. For example, the distal end 369, 469 can engage the exterior edge 377, 477 and, if desired, can include a lip 379, 479 to abut a top surface 380, 480 of the panel 375, 475.

Figure 18:
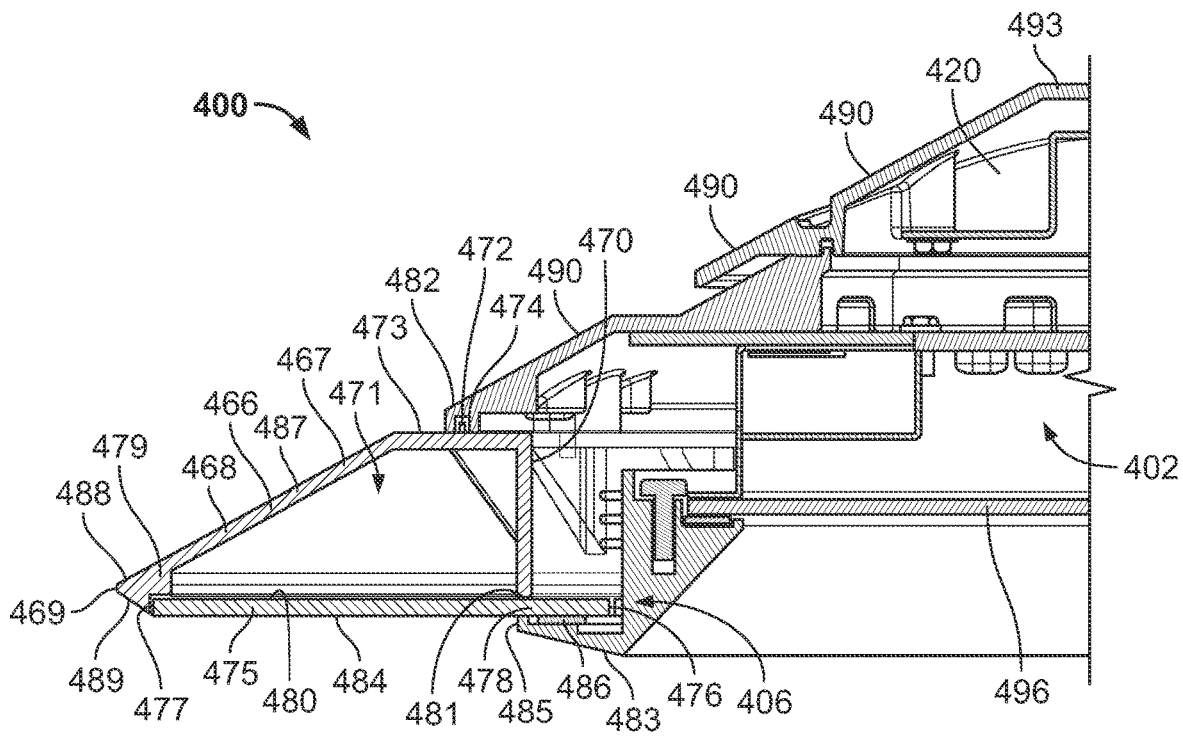
FIG. 18 is a cross-sectional detail view of the light fixture of FIG. 15.

Further, in some forms, the indirect lighting member 366, 466 can be arranged so that a bottom surface 381, 481 of the inner wall 370, 470 abuts the top surface 380, 480 of the panel 375, 475. With this configuration, the shroud 367, 467 and the panel 375, 475 can be coupled together and mounted to the housing 320, 420. For example, as shown in FIGS. 14 and 18, the indirect light member 366, 466 can be captured and held between upper and lower members 382, 482, 383, 483 of the housing 320, 420 with the upper member 382, 482 including the channel 374, 474 to receive the coupling wall 372, 472 of the shroud 367, 467 and the lower member 383, 483 engaging a bottom surface 384, 484 of the panel 375, 475. The lower member 383, 483 and the inner wall 370, 470 of the shroud 367, 467 capture the interior portion 378, 478 of the panel 375, 475 therebetween to hold the panel 375, 475 in place aligned with the indirect lighting array 306, 406. The lower member 383, 483 can include spaced engagement walls 385, 386 as shown in FIG. 14 or can include a lip 485 and a separate mounting strip 486 as shown in FIG. 18.

In some forms, shown in FIG. 14, a skirt portion 387 of the outer wall 368 extending from the top portion 373 to the distal end 369 thereof can have a concave configuration curved toward the inner wall 370, a convex configuration curved away from the inner wall 370, or a straight configuration angled away from the inner wall 370 with a linear configuration in a vertical cross-section extending through the fixture 300. In these forms, the top portion 373 can be sized to extend to the outer engagement wall 385, such that the beginning of the skirt portion 387 is vertically aligned with an exterior of the outer engagement wall 385.

In another form, shown in FIG. 18, a skirt portion 487 of the outer wall 468 extending from the top portion 473 to the distal end 469 thereof can have a straight configuration angled away from the inner wall 470 with a linear configuration in a vertical cross-section extending through the fixture 400. In this form, the distal end 469 can include an upper surface 488 and a lower surface 489 angled relative to one another, such that the distal end 469 has an outwardly pointed configuration. The pointed configuration can be vertically offset from the panel 475 as shown, or can be aligned therewith. In the illustrated form, the housing 420 can have a circular configuration and the indirect lighting member 466 can have an annular configuration, such that the skirt portion 487 of the shroud 467 has a frusto-conical shape. As shown, one or more exterior surfaces 490 can also have a frusto-conical shape. So configured, the top portion 473 can be sized to extend past the outer engagement wall 485, such that the skirt portion 387 is aligned with the exterior surfaces 490 of the housing 420, giving the fixture 400 a consistent outer shape.

Rather than a housing 120 as described above that is configured to mount to a dropped ceiling 10, the housings 320, 420 of these forms are configured to be mounted to a substrate 392, 492, e.g., ceiling, wall, floor, etc., of a structure. In a first form shown in FIG. 11, the housing 320 includes a top wall 393 configured to be mounted and secured to the substrate 392 by any suitable mechanism, such as fasteners, snap fit, tongue-and-groove cooperating structure, and so forth. In a second form shown in FIG. 15, the housing 420 is configured to be secured to the substrate 492 via a mounting rod 494 coupled to a top wall 493 thereof. The rod 494 spaces the housing 420 from the substrate 492 a desired distance to position the housing 420 at a predetermined height, for example. Additionally, as shown, the light fixtures 300, 400 can include a transparent or translucent cover 396, 496 coupled to the housing 320, 420 across an open bottom thereof.

It will be appreciated that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. The same reference numbers may be used to describe like or similar parts. Further, while several examples have been disclosed herein, any features from any examples may be combined with or replaced by other features from other examples. Moreover, while several examples have been disclosed herein, changes may be made to the disclosed examples within departing from the scope of the claims.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A light fixture comprising:
   a housing;
   a direct lighting array coupled to the housing and comprising one or more light emitting diodes oriented to project light along a downward axis;
   an indirect lighting array coupled to the housing and comprising a plurality of light emitting diodes oriented to project light along axes extending transverse to the downward axis; and
   an indirect lighting member mounted to the housing to be laterally outwardly from and within a path of illumination of the plurality of light emitting diodes of the indirect lighting array, such that energizing the plurality of light emitting diodes of the indirect lighting array illuminates the indirect lighting member; wherein the indirect lighting member comprises a shroud coupled to the housing above the indirect lighting array, the shroud having an outer wall extending outwardly from the housing to intersect the path of illumination of the plurality of light emitting diodes of the indirect lighting array, and a bottom wall coupled to the housing to be laterally outwardly from and within the path of illumination of the plurality of light emitting diodes of the indirect lighting array, the outer wall of the shroud extending over at least a portion of the bottom wall; and wherein the bottom wall is transparent or translucent, such that light emitted from the indirectly lighting array or transient light can pass therethrough to illuminate the outer wall of the shroud.

2. The light fixture of claim 1, wherein the outer wall of the shroud comprises a convex configuration.

3. The light fixture of claim 1, wherein the outer wall of the shroud comprises a concave configuration.

4. The light fixture of claim 1, wherein the outer wall of the shroud comprises an angled portion having a linear cross-section in a vertical plane.

5. The light fixture of claim 4, wherein a distal end of the outer wall of the shroud includes an upper surface and a lower surface angled relative to one another giving the distal end an outwardly pointed configuration.

6. The light fixture of claim 1, wherein the outer wall of the shroud has a textured configuration such that the shroud is configured to diffuse light.

7. The light fixture of claim 1, wherein a distal end of the outer wall of the shroud is disposed outwardly of an outer edge of the bottom wall.

8. The light fixture of claim 1, wherein the shroud further comprises an interior wall, the outer wall extending outwardly from a top portion of the interior wall.

9. The light fixture of claim 8, wherein a bottom edge of the interior wall abuts a top surface of the bottom wall.

10. The light fixture of claim 1, wherein the outer wall of shroud and the bottom wall have annular configurations.

11. The light fixture of claim 10, wherein at least a portion of an outer wall of the housing and at least a portion of the outer wall of the shroud have frusto-conical configurations that are aligned with one another.

12. The light fixture of claim 1, wherein the indirect lighting array is oriented to project light along axes extending perpendicular to the downward axis.

13. The light fixture of claim 12, wherein the bottom wall has a planar configuration aligned with the axes of the indirect lighting array.

14. The light fixture of claim 1, wherein the shroud further comprises a coupling wall extending upwardly from the outer wall; and the housing comprises a channel sized to receive the lock wall therein to interlock the shroud with the housing.

15. The light fixture of claim 1, wherein the housing further comprises a top wall configured to be mounted to a substrate of a building.

16. The light fixture of claim 1, further comprising a mounting rod, the housing coupled to the mounting rod to thereby secure the light fixture to a substrate of a building.

17. The light fixture of claim 1, wherein light emitted from the indirect lighting array is incident upon an interior edge of the bottom wall.

* * * * *